Sept. 15, 1942.  D. CARTER  2,296,088
NUT CRACKER
Filed Sept. 20, 1940  2 Sheets-Sheet 1
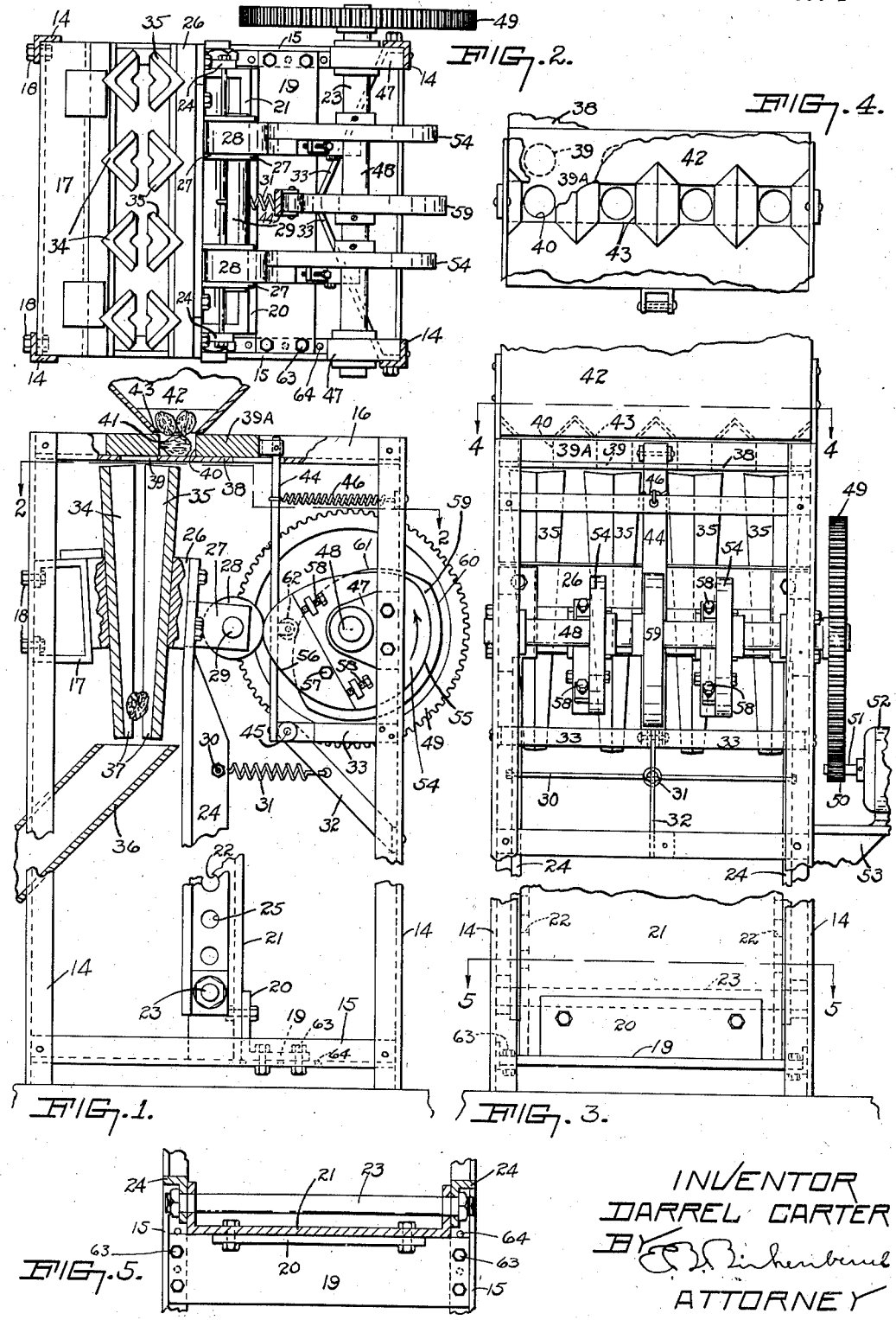
INVENTOR
DARREL CARTER
BY
ATTORNEY Sept. 15, 1942. D. CARTER 2,296,088
NUT CRACKER
Filed Sept. 20, 1940 2 Sheets-Sheet 2
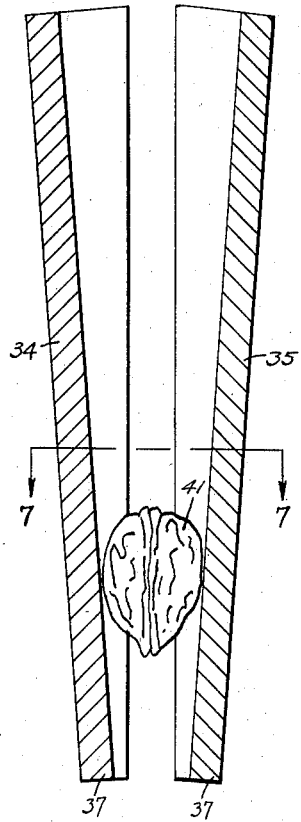
FIG. 6.
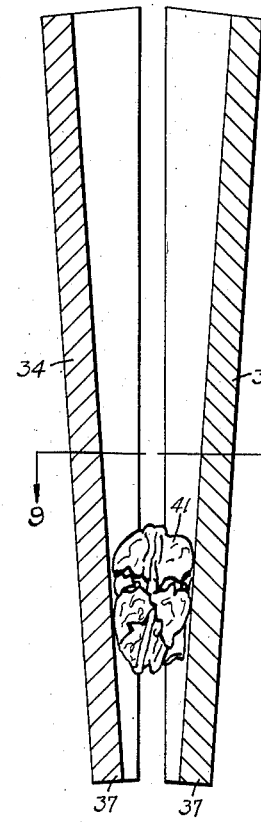
FIG. 8.
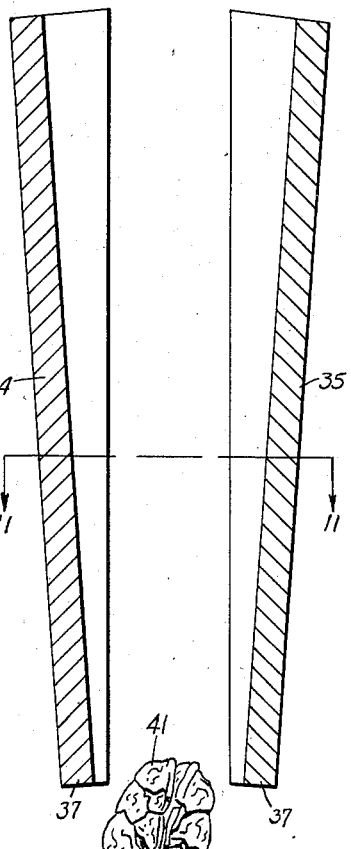
FIG. 10.
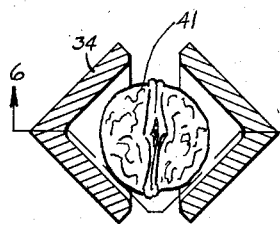
FIG. 7.
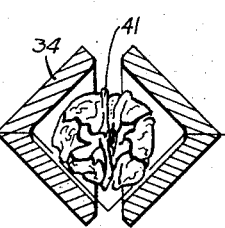
FIG. 9.
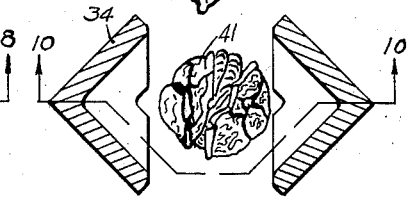
FIG. 11.
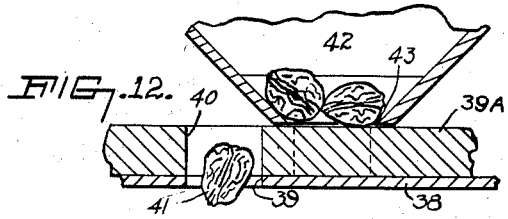
FIG. 12.
INVENTOR
DARREL CARTER
BY
ATTORNEY Patented Sept. 15, 1942

2,296,088

UNITED STATES PATENT OFFICE 2,296,088

NUTCRACKER

Darrel Carter, Riddle, Oreg.

Application September 20, 1940, Serial No. 357,596

1 Claim. (Cl. 146—12)

This invention relates generally to crushers and particularly to a nut cracker.

The main object of this invention is to construct a commercial form of nut cracker whereby nuts may be quickly and easily cracked in a manner to leave the meat thereof in unbroken halves.

The second object is to provide a nut cracker of the class described whereby the percentage of unbroken half nut meats may be increased.

The third object is to construct a machine of the class described having a wide range of adaptability for various kinds and sizes of nuts.

These and other objects are accomplished in the manner set forth in the following specification as illustrated in the accompanying drawings, in which:

Fig. 1 is a fragmentary side elevation of the device showing the cracker jaws in a crushing position.

Fig. 2 is a horizontal section taken along the line 2—2 in Fig. 1.

Fig. 3 is a fragmentary front elevation of the device.

Fig. 4 is a fragmentary horizontal section taken along the line 4—4 in Fig. 3.

Fig. 5 is a fragmentary horizontal section taken along the line 5—5 in Fig. 3.

Fig. 6 is a vertical section through a pair of cracker jaws taken along the line 6—6 in Fig. 7, showing the jaws in a loading position.

Fig. 7 is a section taken along the line 7—7 in Fig. 6.

Fig. 8 is a vertical section through the cracker jaws taken along the line 8—8 in Fig. 9 showing the jaws in a cracking position.

Fig. 9 is a horizontal section taken along the line 9—9 in Fig. 8.

Fig. 10 is a vertical section through the cracker jaws taken along the line 10—10 in Fig. 11 showing the jaws in a discharging position.

Fig. 11 is a section taken along the line 11—11 in Fig. 10.

Fig. 12 is a fragmentary section showing the loading operation.

Similar numerals refer to similar parts throughout the several views.

Referring in detail to the drawings there are shown four upright frame members 14 that are united at their lower ends by the cross ties 15 and at their upper ends by the cross ties 16. Between one pair of uprights 14 is secured a channel shaped stationary jaw support 17 by means of the bolts 18.

Secured across two of the members 15 is an angle plate 19 against whose upturned side 20 is secured the vertical channel member 21 on the side of which are a series of holes 22 adapted to receive the horizontal bolt 23 on each end of which is hinged an angle bar 24 through whose holes 25 extend the bolt 23. The upper ends of the members 24 are united by the plate 26 on whose rearward side extend the standards 27 between which are placed the rollers 28 which are free to rotate on the pins 29 carried by the standards 27.

A cross rod 30 connects the members 24 and has attached thereto a spring 31 which is anchored to the brace 32 which is disposed between the members 14 and the horizontal bracket 33. Secured to the jaw support 17 are the tapering angle bars 34 which constitute the stationary cracking jaw, while secured to the plate 26 are the tapering angle bars 35 which constitute the movable cracking jaws.

A chute 36 is disposed beneath the lower ends 37 of the members 34 and 35. Above the jaws 34 and 35 is placed a horizontal plate 38 having an outlet opening 39 directly over the upper ends of the jaws 34 and 35. Upon the plate 38 is slidably mounted an ejector 39A having an opening 40 therein, large enough to receive a nut 41 as it descends from the hopper 42 whose outlet 43 registers with the opening 40 in the ejector 39A when the ejector 39A is in a retracted position.

The ejector 39A is connected by a lever 44 to the pivot 45 of the standard 33. A spring 46 urges the lever 44 and ejector 39A to the retracted position shown in Fig. 1.

On two of the upright members 14 are secured the standards 47 in which journals the horizontal shaft 48 on one end of which is secured a gear 49 which meshes with the pinion 50 on the shaft 51 of the motor 52 which is supported on the frame members 14 by means of a bracket 53.

On the shaft 48 are secured the crushing cams 54 each of which is provided with a concentric portion 55 and adjustable crushing lobe 56 which is pivotally mounted on the bolt 57 which is adjusted by means of the screws 58. The combined width of the lobe 56 and the cam 54 is approximately the same as the width of a roller 28.

Secured on the shaft 48 is an ejector cam 59 having a concentric portion 60 which holds the ejector 39A in an extended position in which its opening 40 registers with the jaws 34 and 35.

There is also formed on the cam 59 a retracting surface 61 which, when engaging the roller 62 of the lever 44, permits the ejector to be retracted under the action of the spring 46.

The operation of the device is as follows:

Assuming that a supply of nuts is contained within the hopper 42 and that these have been suitably graded in any convenient manner and it is desired to crack these nuts 41, it is only necessary to start the motor 52 which through the gears 49 and 50 causes the cams 54 and 59 to rotate in unison; the cam 54 producing a swinging motion of the jaw 35 which performs the cracking operation and the cam 59 producing a reciprocating motion of the ejector 39A.

It will be noted in Figs. 6 and 7 which represent the loading position of the jaws 34 and 35, that the nut 41 has fallen downwardly between the jaws 34 and 35 to the position shown—this occurring when the portions 55 of the cams 54 are in engagement with the rollers 28. At the same time the ejector 39A is fully retracted as the cams 54 and 59 revolve in the direction indicated by the arrow in Fig. 1.

The portions 56 of the cam 54 engage the rollers 28 and move the movable jaw 35 to the positions shown in Figs. 8 and 9 performing the cracking operation.

The further movement of the cams 54 will cause the jaws 34 and 35 to separate in the manner shown in Fig. 10 permitting the cracked nut 41 to fall into the chute 36 from whence it may pass to a suitable container.

After this has taken place the jaw 35 is again moved to the position shown in Fig. 1 and the ejector 39A moves a nut into position between each pair of jaws 34 and 35.

In other words, the nuts are cracked one at a time and are released from the jaws as they are cracked before an uncracked nut is permitted to enter the space between the jaws.

It can be seen from the foregoing that regardless of the irregularities in size and shape within a given grade of nut, these irregularities are taken care of by the taper between the jaws 34 and 35 so that a subsequent closing of the jaws will insure the perfect cracking of the nut, since the movement of the jaw is fixed when once adjusted and the nut is in contact with the jaws at the moment of the pressing operation, thereby insuring almost a constant cracking movement for any size of nut and wherein it will be found a simple matter to adjust the device for different types of cracking operations.

It will be noted that the angle plate 19 may be moved by placing its fastening bolts 63 in a desired hole 64 in order to provide a lateral adjustment for the horizontal shaft 23.

I claim:

A nut cracker, the combination of a base, a frame extending upwardly from said base and having a plurality of fixed upright V shaped jaws mounted thereon, cooperating V shaped movable jaws opposing the said fixed jaws, arms supporting said movable jaws from the base, hinges connecting said arms to said base, means for adjusting said hinged connection with the base both horizontally and vertically to cause changes of the cooperative effect of the opposed jaws on the nuts, a cam rotatably mounted in the frame, means for rotating said cam, a roller journaled on the rear face of the movable jaw and bearing upon the cam face, spring means for urging the roller into contact with the cam, said cam having a lobe portion thereof hinged to the remaining portion of the cam and means to vary the position of said hinged lobe to vary the nut cracking stroke of the movable jaws and means to feed nuts between the jaws adjacent the top ends thereof.

DARREL CARTER.